Aug. 25, 1953     T. N. CARTER     2,650,039
REWINDING MACHINE
Filed Nov. 28, 1950     9 Sheets-Sheet 1
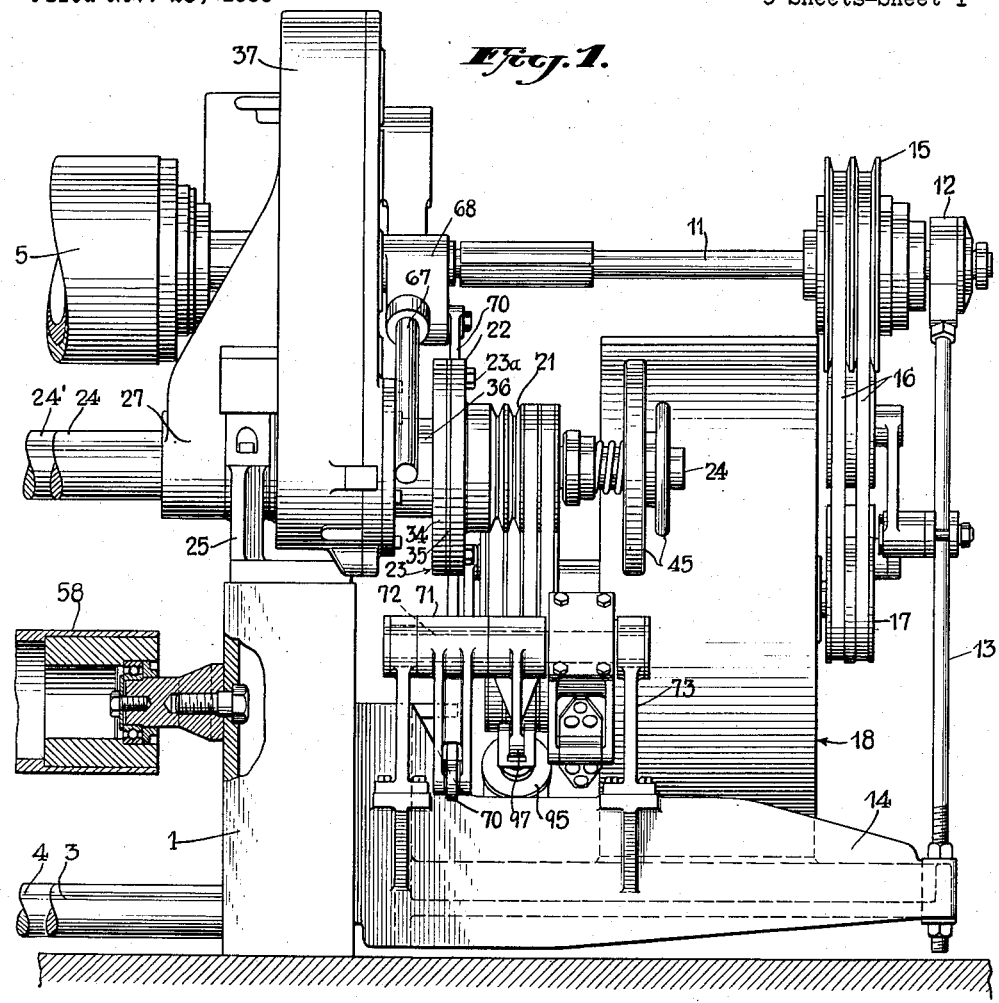
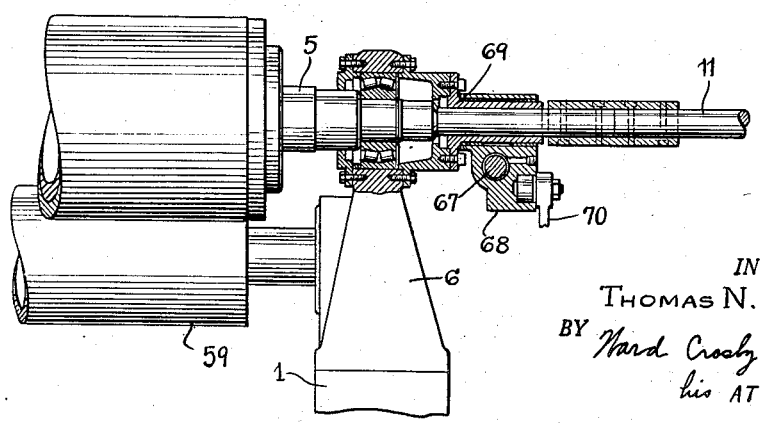
INVENTOR.
THOMAS N. CARTER.
BY
his ATTORNEYS

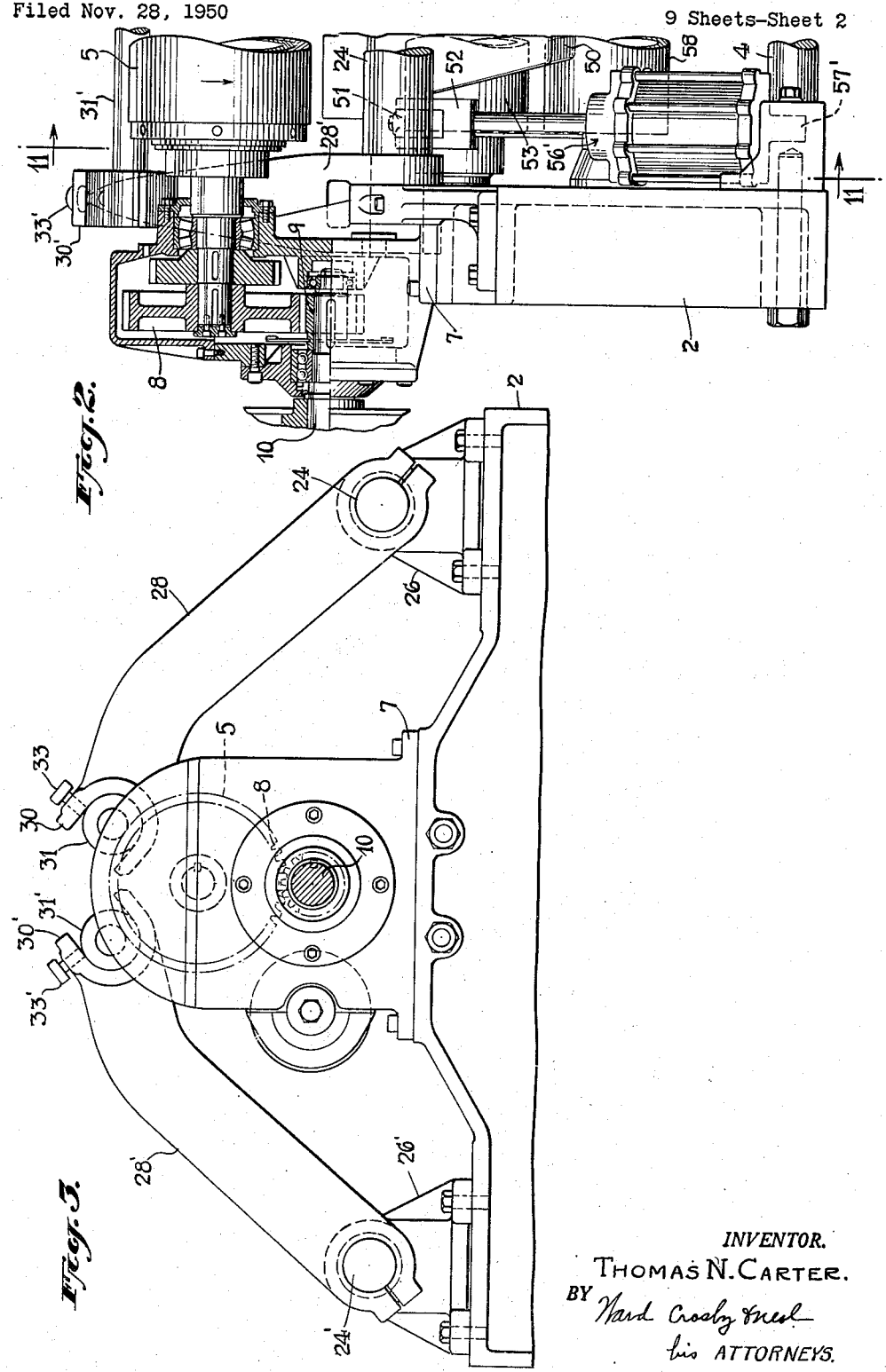

Aug. 25, 1953 T. N. CARTER 2,650,039
REWINDING MACHINE
Filed Nov. 28, 1950 9 Sheets-Sheet 3

INVENTOR.
THOMAS N. CARTER.
BY Ward Crosby & Neal
his ATTORNEYS.

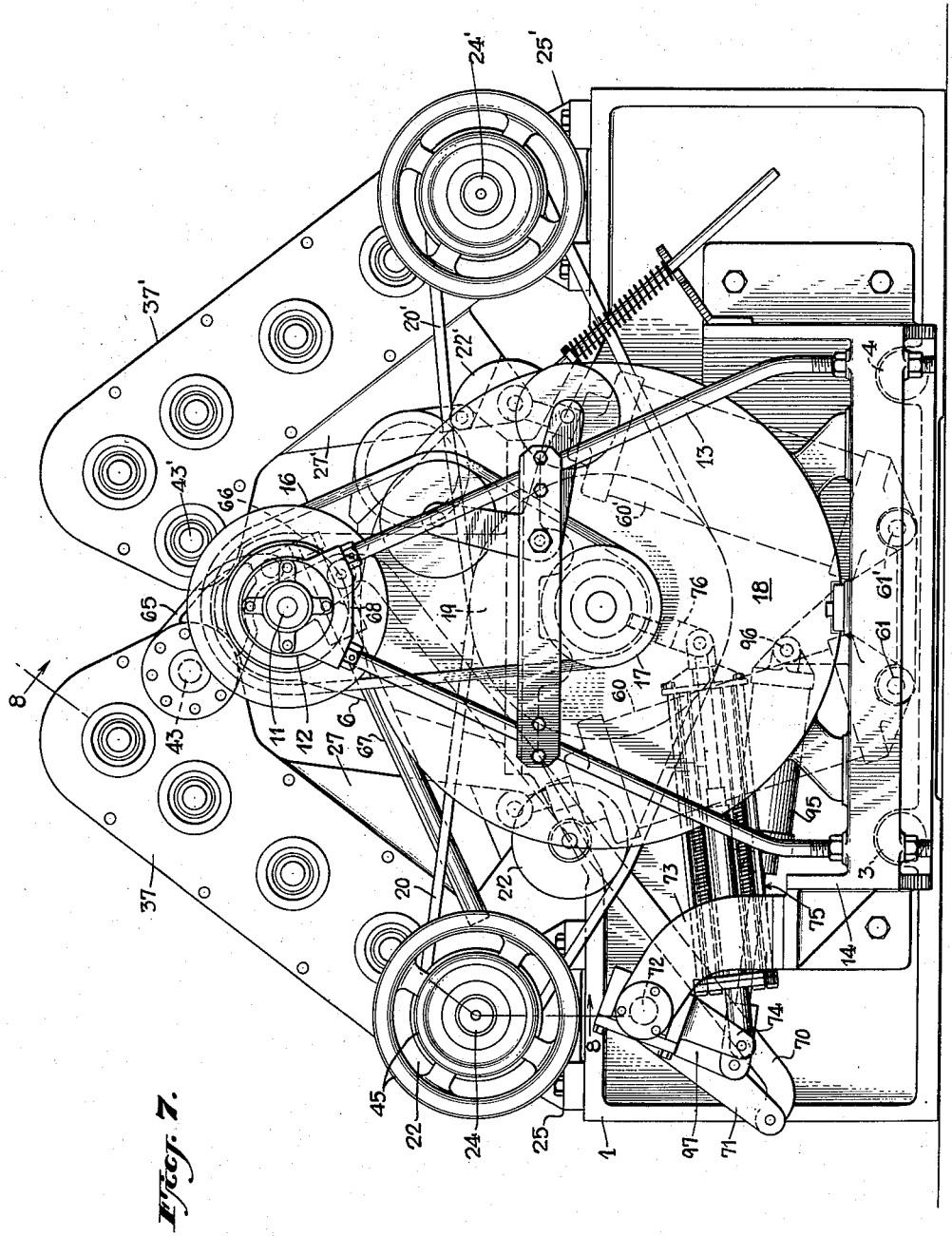

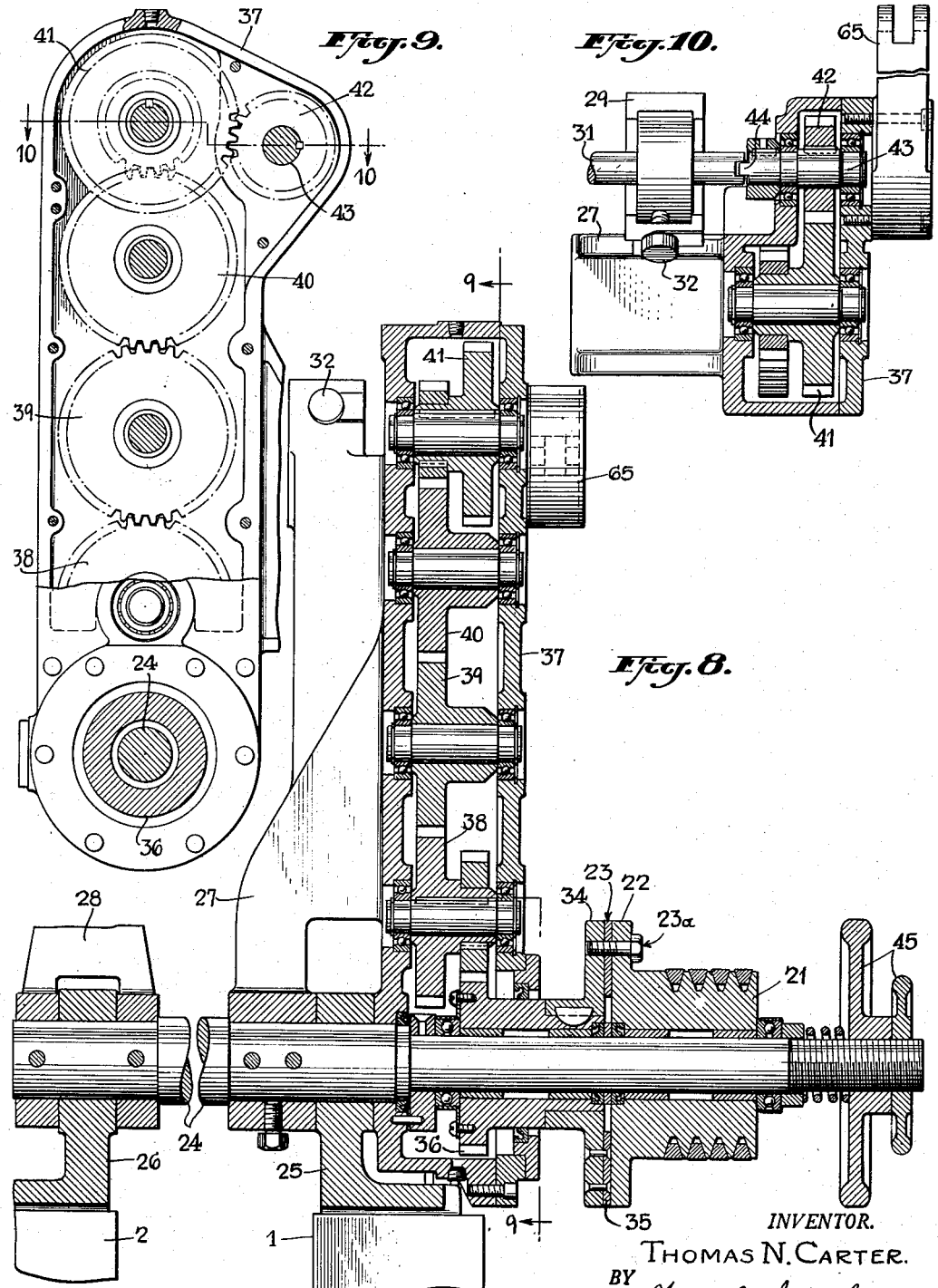

Aug. 25, 1953 T. N. CARTER 2,650,039
REWINDING MACHINE
Filed Nov. 28, 1950 9 Sheets-Sheet 6

INVENTOR.
THOMAS N. CARTER.
BY
his ATTORNEYS.

Aug. 25, 1953 T. N. CARTER 2,650,039
REWINDING MACHINE
Filed Nov. 28, 1950 9 Sheets-Sheet 7

INVENTOR.
THOMAS N. CARTER.
BY
his ATTORNEYS.

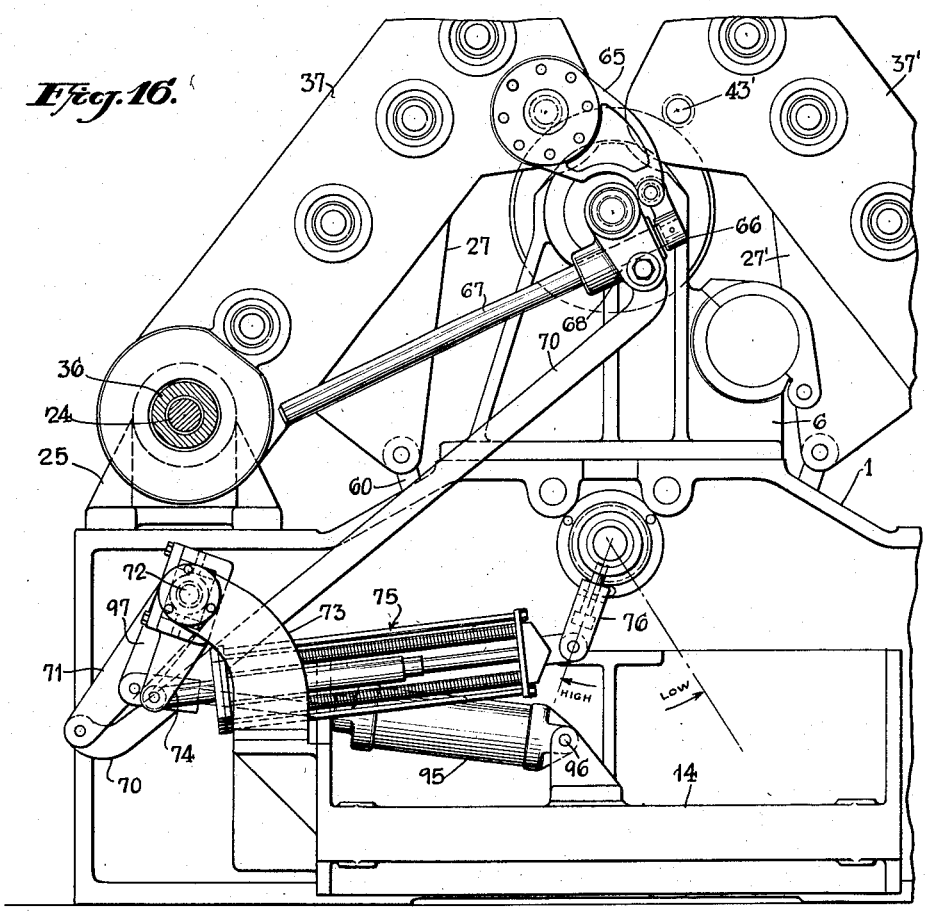
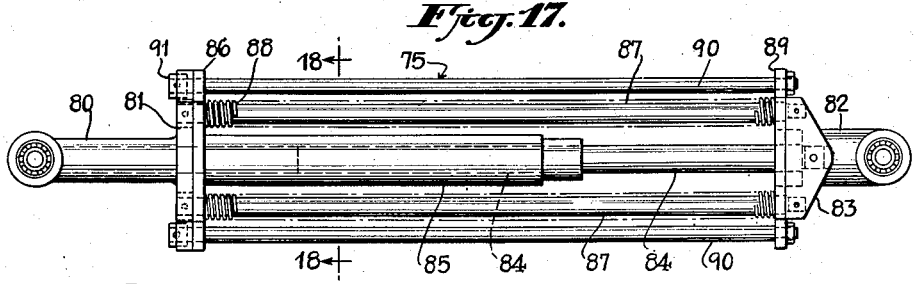
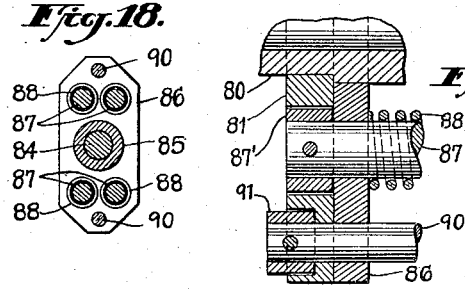

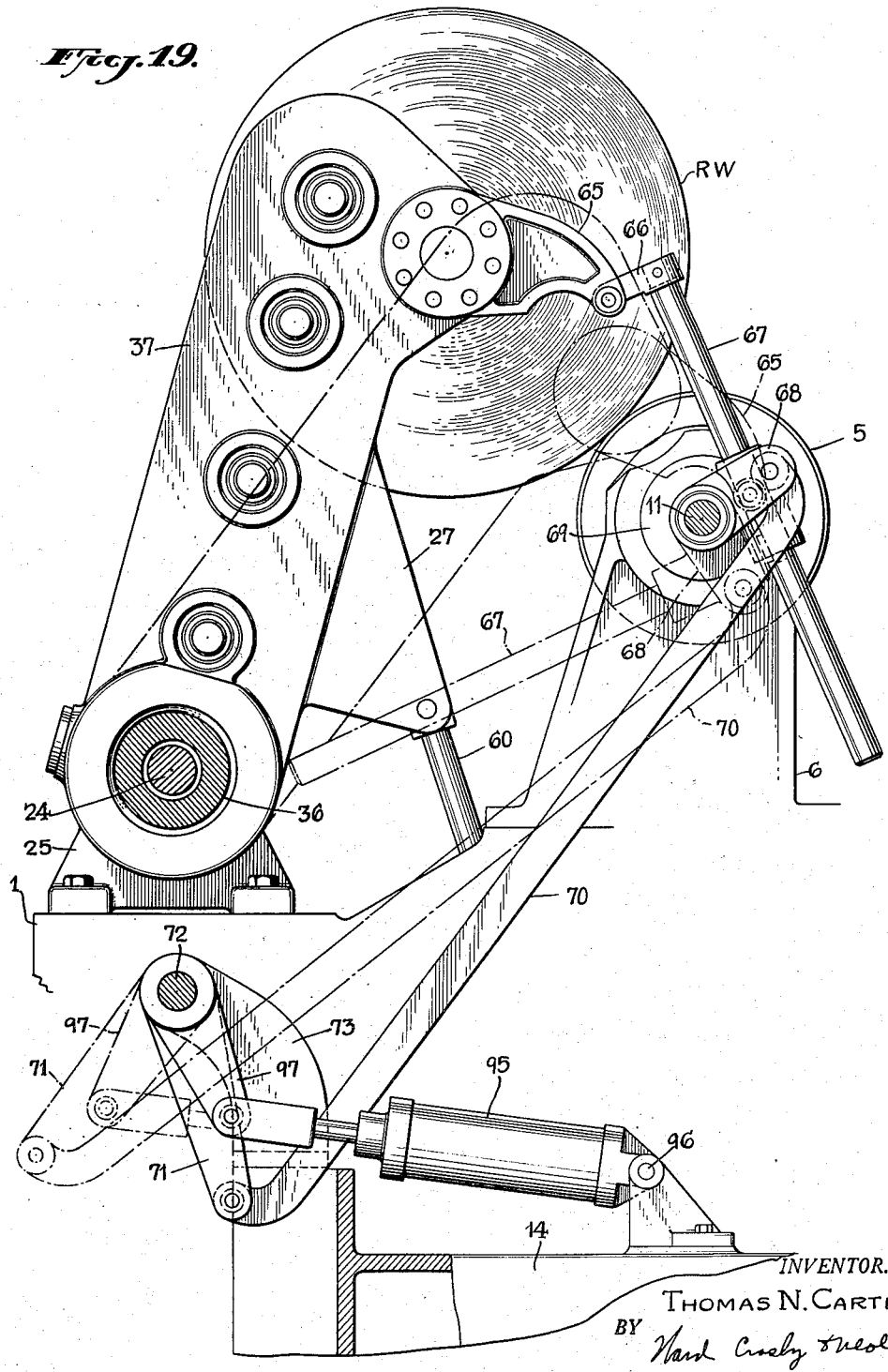

Patented Aug. 25, 1953

2,650,039

UNITED STATES PATENT OFFICE 2,650,039

REWINDING MACHINE

Thomas N. Carter, Bayside, N. Y., assignor to Cameron Machine Company, Brooklyn, N. Y., a corporation of New York Application November 28, 1950, Serial No. 197,896

4 Claims. (Cl. 242—65)

This invention relates to improvements in rewinding machines and is particularly useful in slitting and rewinding machines. The invention is shown by way of illustration as embodied in a machine of the duplex type, i. e., where two shafts are employed for supporting the rewound rolls. However, certain features of the invention are useful in machines of other types.

As known in the prior art, the variation in size of the rewind rolls introduces variation in peripheral speed with attendant difficulties. For instance, in a slitting and rewinding machine the mill web passes around a constant speed roll against which the cutters operate to cut the web to desired rewind width. These cut widths pass to the rewind rolls which rest against the constant speed roll. Heretofore a variation in rewind shaft speed has been permitted by the use of driving clutches which were allowed to slip in an effort to take care of the difference in rotative speed. However, this had the objectionable features, among others of a quite substantial clutch slippage and the introduction of undesirable stresses on the web and rewound rolls due to the pressure required to be exerted in order to produce clutch slippage. Additionally, this provision did not produce as accurate a control as desired.

An object of the present invention is to provide a machine in which the driving speed of the rewind shafts is varied in accurate relationship to the size of the rewind roll, so that as the rewind roll diameter increases the rotative speed is correspondingly decreased.

Another object is to provide such rotative speed variation entirely independently of the pressure between the rewind rolls and the constant speed roll, such as the cutter roll.

Further objects are to provide improved control means for said speed variation, and means of manipulating the rewind shafts and rewound rolls carried thereby.

Further objects and advantages of the invention will more fully appear from the following description taken in connection with the accompanying drawings which show, by way of example, the present preferred form of the invention.

Referring to the accompanying drawings, in which the same reference characters indicate the same parts in the various views—

Fig. 1 is a front elevational view of the right hand end of an embodiment of my invention in the form of a slitting and winding machine showing the variable speed drive controls for the winding shafts;

Fig. 2 is a similar view of the left hand end of the machine showing the power input or main drive end, partly in section;

Fig. 3 is an end elevational view of the left hand end of the machine on the same scale as Fig. 2;

Fig. 4 is a front elevational view, partly in section, of the right hand end of the sleeve shaft and speed control parts associated therewith;

Fig. 7 is an end elevational view of the right hand end of the machine;

Fig. 8 is a cross-sectional view of a winding pivot arm taken on line 8—8 of Fig. 7;

Fig. 9 is a cross-sectional view taken on line 9—9 of Fig. 8;

Fig. 10 is a cross-sectional view taken on line 10—10 of Fig. 9 and showing the top or outer end view of the arm shown in Figs. 8 and 9 partly in section;

Fig. 16 is an end elevational view similar to Fig. 4 but with certain parts omitted so as to more clearly show certain features of the speed control actuating mechanism;

Fig. 17 is a side elevational view of the over-travel spring link of the control actuating mechanism;

Fig. 18 is a cross-sectional view taken on line 18—18 of Fig. 17;

Fig. 18a is an enlarged fragmentary view showing further details of certain parts of Fig. 17; and Fig. 19 is a view similar to Fig. 16 with the parts in an adjusted position to better illustrate movement of the parts.

*Frame and drive*

Figure 5:
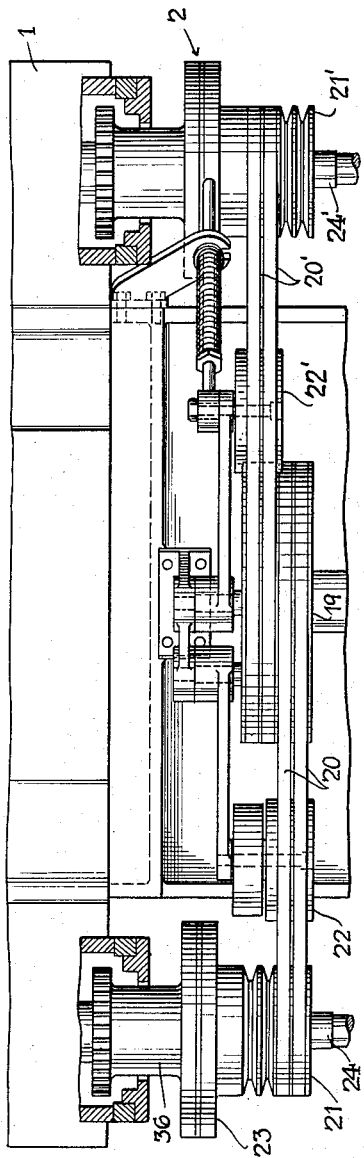
Fig. 5 is a plan view and Fig. 6 is an end elevational view of the variable speed selector power output end showing the drive delivery to the winding rolls.
Figure 6:
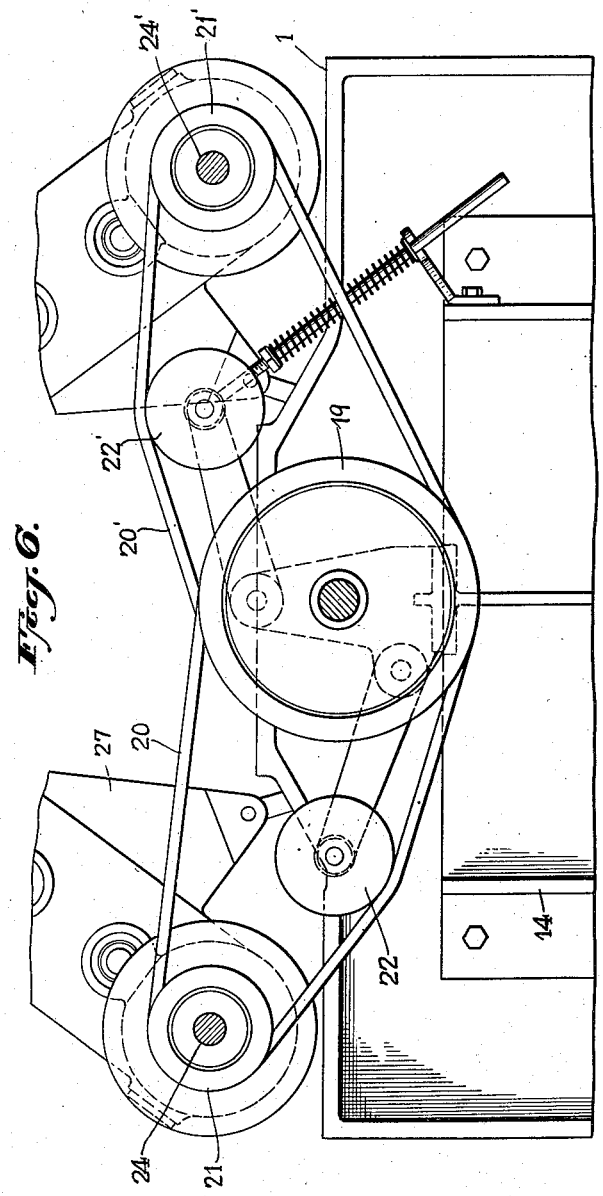

Referring more particularly to Figs. 1, 2 and 3, the main frame of the machine comprises right and left hand base frame members 1 (Fig. 1) and 2 (Fig. 2) and tie bars, such as a pair of lower bars 3 and 4. A sleeve shaft 5 has its right hand end journaled in a housing 6 (Fig. 4) rigidly supported on base frame 1 and its left hand end journaled in a housing 7 (Fig. 2) rigidly supported on base frame 2. The shaft 5 is suitably driven at substantially constant speed by means of a spur gear 8, carried on said shaft end supported in housing 7, in driven engagement with a pinion gear 9, carried on a shaft 10 connected to a suitable source of power. The opposite end of the sleeve shaft 5, which is journaled in housing 6 (Fig. 4) is connected to an extension shaft 11 whose outer end (Fig. 1) is journaled in a housing 12 supported on rods 13 whose lower ends are rigidly secured to a supplemental frame base member 14 securely attached to the base frame 1. A sheave 15 is secured to shaft 11 and is drivingly connected by means of V-belts 16 to a sheave 17 secured on the power input shaft of variable speed mechanism, designated as 18, which is mounted on the base member 14 and which has an output power shaft carrying secured thereto a sheave 19 (Figs. 5 and 6). The variable speed mechanism may be of any suitable type (i. e., mechanical, fluid, or electrical) so long as it provides an output side whose rotative speed may be varied. In the present embodiment the unit employed being known as VV-5 speed selector sold by B. F. Goodrich.

The sheave 19 is drivingly connected by means of V-belts 20 to a sleeve shaft driving sheave 21. The belts being provided with a weighted tightening pulley 22. The pulley 21 is freely rotatably journaled on the output end of a rewind arm pivot shaft 24 (Fig. 8) pivotally supported in housings 25—26 carried on the base frame members 1 and 2 (Figs. 8, 1, 2 and 3). The pivot shaft 24 carries rigidly secured adjacent its respectively opposite ends a pair of rewind shaft pivot arms 27 and 28 provided at their upper free ends (Fig. 3) with respective yokes 29 and 30 for receiving journal ends of a rewind shaft, designated in general as 31, and suitably held in position on side arms by means of latch pins, such as 32 and 33. Means for driving the rewind shaft 31 from the clutch sheave 21 will now be described.

Referring more particularly to Figs. 8, 9 and 10: the friction clutch 23 comprises a driven flange plate 34 having a friction facing 35 abutting the inner face of the friction plate 22. The flange plate 34 is rigidly secured to the hub of a drive gear 36 which is freely journaled on the pivot shaft 24 and is in driving engagement with a gear train supported in a housing, designated in general as 37, and rigidly secured to the pivot arm 27 for movement therewith. This gear train comprises a first intermediate gear assembly 38, a second intermediate gear 39, a third intermediate gear 40, and a fourth intermediate gear assembly 41 which is in driving engagement with a rewind shaft pinion 42 carried on a rewind drive shaft 43 whose inner end is provided with driving lugs or fingers 44 adapted to drivingly engage cooperating portions formed on the adjacent outer end of the rewind sleeve shaft 31 disposed in yoke 29. The gear train 36—42 is disposed entirely within the oiltight housing 37 so that the gears and their bearings are in constant lubrication. The friction clutch 23 is provided with the usual adjusting and locking wheels, designated collectively as 45, and the clutch is further provided with means for selectively locking the driving and driven plates together in fixed relationship to provide a direct drive from the pulley 21 to the said gear train. In the present embodiment this locking is effected by means of a screw 23a passing through the plate 22 and in threaded engagement with the plate 34. It should be noted at this time that the friction clutch 23 is relied upon only for minor variation in speed due to the differences in diameter between the roll being wound on the front shaft 31, above described, and that being wound on the corresponding rear shaft to be referred to hereinafter; it being understood that this friction clutch is not depended upon, as in the prior art, to effect the desired variation in the rotative speed of the rewind sleeve shafts in order to maintain a substantially uniform surface speed of the rewind rolls. Because of this feature of the present invention it may be desired to eliminate any slippage in the friction clutch 23 when only the front rewind shaft 31 is in operation; and in this condition the clutch plates are locked together as by screw 23a, otherwise the screw is removed.

The present embodiment being a duplex type machine, mechanism corresponding to that previously described with reference to the front rewind shaft 31 is provided on the rear of the machine (Figs. 3 and 7) and since these parts correspond in all respects with those previously described (except as specifically noted below) it will not be necessary to repeat the description of these parts; but for purposes of reference and identification corresponding parts for the rear rewind shaft will be designated by the same reference characters as those used in connection with the front shaft, with the added prime suffix.

Cutter mechanism

Figure 13:
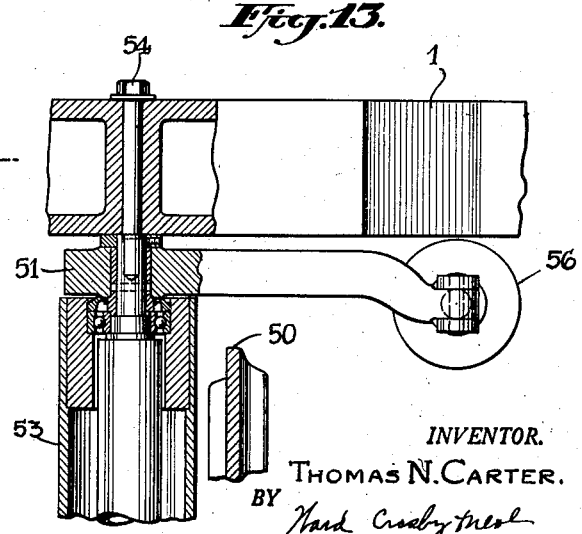
Fig. 13 is a cross-sectional view taken on line 13—13 of Fig. 12.
Figure 14:
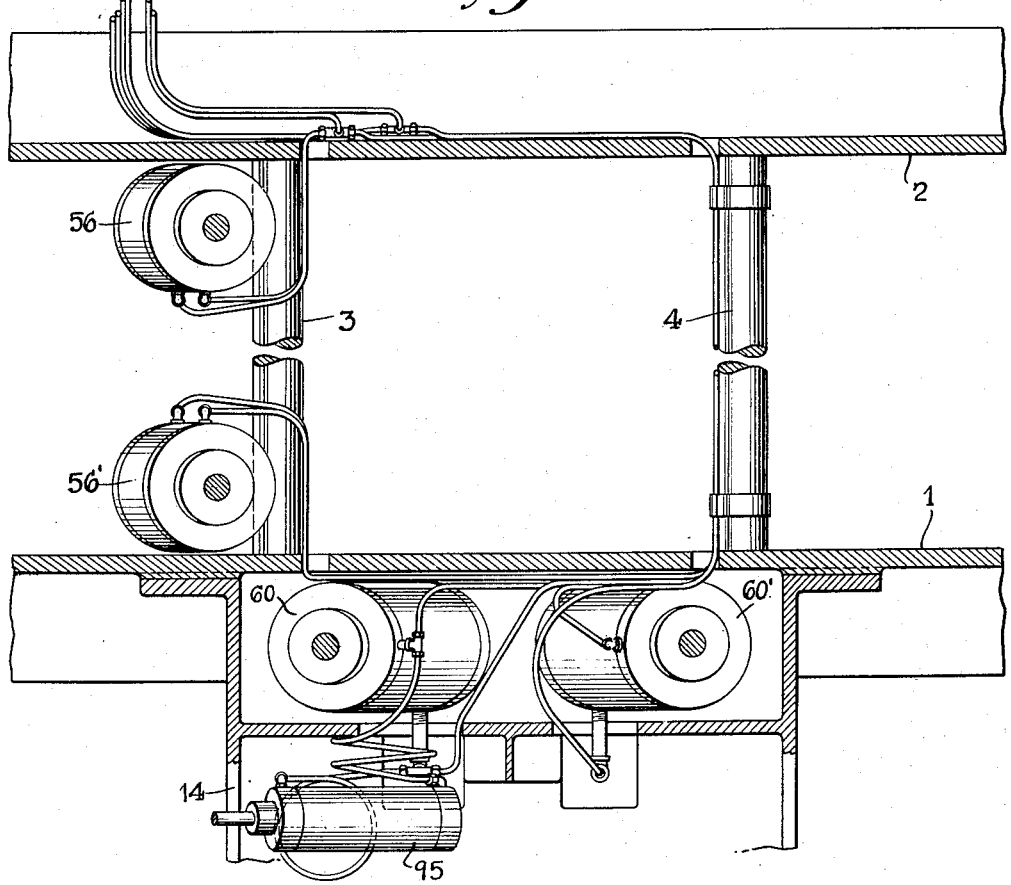
Fig. 14 is a plan view, partly in section, showing the mounting and piping for the pneumatic actuating cylinders.

Referring more particularly to Figs. 2, 11, 12 and 13: the cutter bar 50 is supported at its respectively opposite ends on arms 51 and 52 pivotally journaled adjacent the outer ends of an inner idle roll 53 from journal studs which are fixed in their respective frames 1 and 2 and on the inwardly extending ends of which are rotatably journaled the idle roll 53; the stud carried on the frame 1 being designated 54 in Fig. 13. The cutter bar 50 is adapted to support a plurality of cutter units, such as 55, carrying the usual cutter disks for cutting a web of paper passing around the sleeve shaft 5, which also acts as a cutter platen. The arms 51 and 52 are pivotally connected at their outer ends to pistons of fluid actuating units, designated in their entirety as 56 and 56', whose respective cylinders are pivotally mounted as at 57 and 57' to a permanent part of the frame. In the present embodiment the fluid actuators are operated by compressed air. It will thus be seen that the cutters may be moved toward and from cutting position by controlling the air pressure admitted to one or the other side of the pistons of the actuating units 56—56', and suitable cutting pressure may be exerted by the pneumatic pressure if desired: it being understood that each cutter may be individually adjusted as to pressure by means not herein disclosed (see also Fig. 14).

Figure 11:
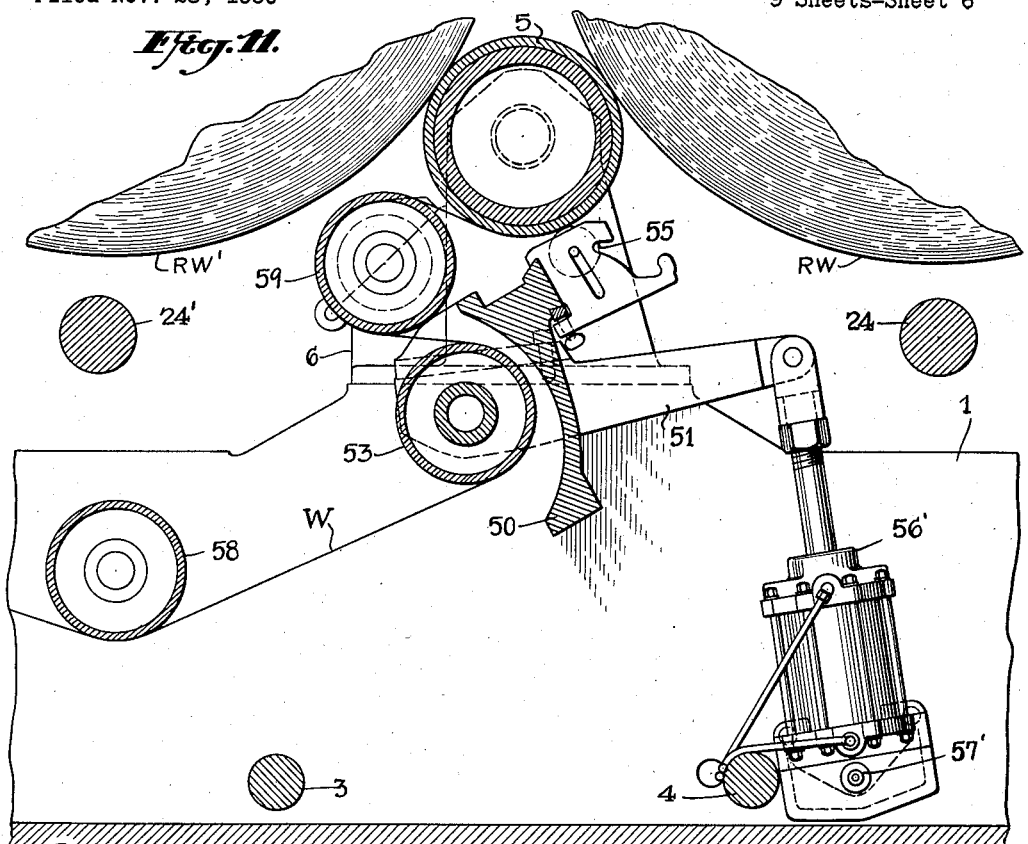
Fig. 11 is a somewhat diagrammatical cross-sectional view taken approximately on line 11—11 of Fig. 2 showing certain features of the cutter bar mechanism.
Figure 12:
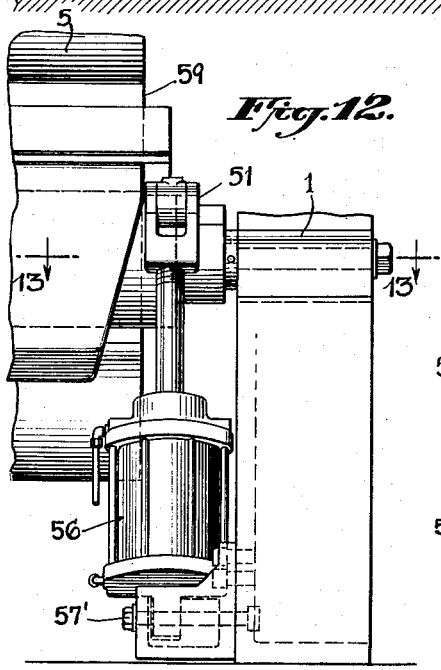
Fig. 12 is a fragmentary front elevational view of the right hand end of the cutting bar mounting.

Referring to Fig. 11: it will be seen that a web of paper W may be fed from the mill roll around an idle roll 58, around an inner idle roll 53, around a pull roll 59 and under the sleeve shaft or backing roll 5 against which it may be cut into desired rewind widths by the cutters 55; the cut widths passing upwardly around the roll and alternately to the front and rear rewind shafts so as to form staggered rewind rolls, designated as RW and RW'. It is noted at this point that in the present invention these rewind rolls need not exert a substantial pressure on the backing roll 5, since the drive of these rolls is independent of any friction drive from the roll 5; and preferably these rolls merely "kiss" the sheet material passing over the roll 5.

Lift for rewind shaft pivot arms

Means for lifting and lowering the rewind shaft mechanisms and rolls carried thereby, and for adjusting the pressure exerted by said rolls against the backing roll 5 will now be described.

Figure 15:
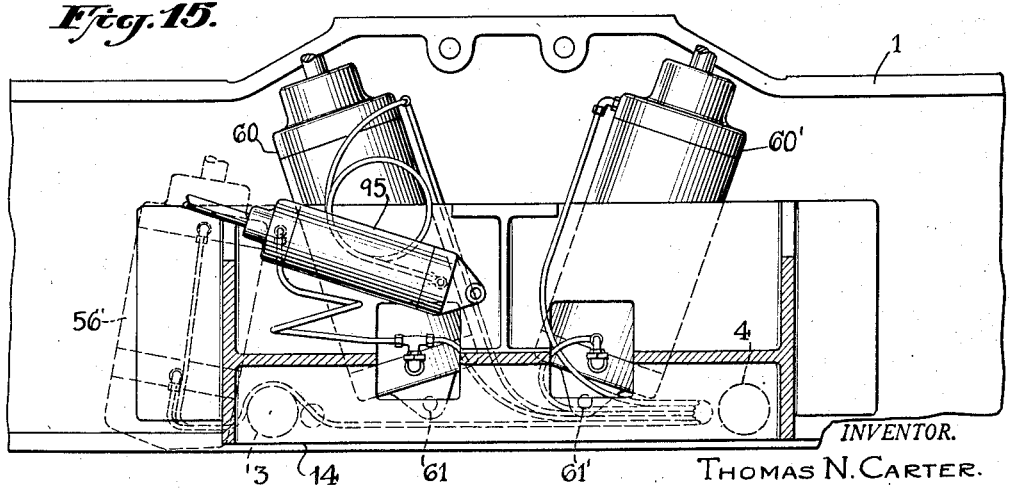
Fig. 15 is an end elevational view of the parts shown in Fig. 14.

Referring more particularly to Fig. 7: it will be seen that the rewind shaft pivot arms 27—27' are provided with inwardly and downwardly extending portions which are pivotally connected to the pistons of respective fluid actuating units, designated in their entirety as 60 and 60'. The cylinders are pivotally supported at their lower ends on pivots 61 and 61' carried on the base member 14 (see also Figs. 14 and 15). Accordingly, by suitable control of the compressed air supply to the top or bottom end of the cylinders, the pivot arms and rolls carried thereby may be raised or lowered and the pressure exerted by the rewind rolls against the backing roll may be suitably controlled.

Control means for rewind shaft drive

Since the diameter of the front and rear rewind rolls will be substantially the same the variation in rotative speed of the two rolls at all times will be substantially equal and in the present embodiment the rotative speeds of the two rolls is controlled in accordance with the diameter of the front roll only. This control is effected in accordance with the angular movement of the rewind sleeve pivot arm 27, which angle necessarily varies in proportion to the diameter of the front rewind roll. In accordance with this invention I utilize this angular movement for controlling suitable variable speed mechanism interposed in the drive of the rewind rolls. Any suitable variable speed mechanism may be employed, such as mechanical, hydraulic or electrical. In the embodiment now to be described a mechanical variable speed selector is shown by way of example, but it is to be understood that the invention is not to be limited to any particular type of variable speed mechanism.

Mechanical variable speed embodiment

Referring more particularly to Figs. 8 and 10: arm 65 is rigidly secured to the gear housing 37 and thereby is rigidly secured to the pivot arm 27. This arm serves as a clevis arm which is pivotally attached (Fig. 16) at its outer end to the upper end 66 of a sliding rod 67 which is freely slidably disposed in a sliding rod guide 68 (see also Fig. 4) pivotally journaled on a bearing 69 rigidly secured to the housing member 6, with the end of the sleeve shaft 5 passing freely through said bearing. The guide 68 is pivotally attached to the upper end of a control link 70 whose lower end (Fig. 16) is pivotally attached to a torque arm 71 fixed on a torque shaft 72 which is suitably journaled in brackets, such as 73, rigidly fixed to the base frame member 14 (Fig. 1). The torque shaft 72 also carries fixed thereto an arm 74 whose outer end is pivotally connected to an over-travel link, designated in its entirety as 75, the details of which will be more particularly described below. The other end of the link 75 is pivotally connected to a speed control adjusting arm 76 which forms a part of the variable speed selector 18 and the movement of said adjusting arm from the full line position shown in Fig. 16 (which corresponds to the high speed) through the angular movement indicated by the reference line serves to set the variable speed selector to deliver its low output rotative speed. The over-travel link 75 transmits sufficient actuating force to move the adjusting arm 76 while permitting over-travel of the actuating arm 74 in either direction, while the arm 76 is immovable, without damage to the mechanism. This is important where a mechanical variable speed selector is used; since when this type of variable speed selector is not in operation (as when the power is off) movement of the adjusting arm 76 would damage the selector mechanism; and it is necessary to move the rewind shaft pivot arms when the machine is not being driven.

Over-travel link

Referring more particularly to Fig. 17: the over-travel link 75 comprises an end member 80 having a cross head 81 rigidly secured thereto and a spaced apart end member 82 having a cross head 83 and an inwardly extending slide rod 84. The rod 84 telescopically engages within a tubular member 85 having an end secured to a cross plate 86 disposed adjacent but movable with respect to the cross head 81. A plurality of rods 87 (in the present embodiment an upper pair and a lower pair) are attached at one end to the cross head 83 with their opposite ends passing freely through cross plate 86 with limit stops 87' secured to their outwardly extending ends. The rods 87 are surrounded by a plurality of helical coil springs, such as 88, which are anchored at one end to the plate 86. A cross plate 89 is slidably disposed on the rod 84 and the rods 87 and abuts the adjacent ends of springs 88. The cross plate 89 carries fixed thereto one end of a pair of rods 90 whose opposite ends are slidably disposed in the plate 86 and cross head 81 and are provided with limit stops, such as 91, which serve to hold the parts together and the springs 88 under the desired initial compression which is determined by the force necessary to actuate the adjusting arm 76 of the variable speed selector; the resiliency of the springs being such that they may be compressed throughout the desired limit of travel by a force less than that which would cause damage to the variable speed mechanism when at rest. In operation, the over-travel link functions in the following manner. With the variable speed selector in normal operation the link acts to transmit movement to the adjusting arm 76. However, when the adjusting arm resists movement, as when the selector is not in operation, the over-travel link operates as follows:

When under tension, with the end members 80 and 82 moving away from each other, the springs are placed under compression between the plates 86 and 89, at which time the cross head 81, the tie rods 90 and the cross plate 89 have a relative movement to the left with respect to the cross plate 86, the rods 87 and the cross head 83. When the link is placed under compression, i. e., when the end members 80 and 82 are moved relatively toward each other, the springs 88 are also placed under compression between the cross head 81 and cross plate 86 on the one hand and the cross plate 89 and cross head 83 on the other hand. The telescopic engagement between the tubular portion 85 and the rod 84 serves to maintain the mechanism in proper alignment. It will be seen from the foregoing that the over-travel spring link above described provides a connecting link which serves to transmit control movement to the variable speed selector without damage to the mechanism when the selector is not operating, as when the drive shaft of the machine is not being rotated.

In order to further avoid damage to the control mechanism, when the rewind shaft pivot arms are being manipulated at times when the rolls are not being wound, I provide a fluid actuating means, designated in its entirety as 95 (Figs. 1 and 16), comprising a cylinder pivotally supported at 96 from the frame member 14 and having a piston rod pivotally connected to the outer end of an arm 97 which is secured to the torque shaft 72; the fluid actuator 95 is double acting (Figs. 14 and 15) and is interconnected with the rewind shaft arm actuating cylinders 60 and 61 for opposite actuation to said arm cylinders. In other words, the lower ends of the cylinders 60—61 are connected to the upper end of the cylinder 95 so that when the pivot arms are being moved in one direction or the other the control link 70 and rod journal are correspondingly adjusted without strain.

The movement of the control mechanism may be better understood with reference to Fig. 19, which shows the linkage mechanism in broken lines when the rewind rolls are commencing to be wound and are of minimum diameter; while the parts shown in solid line indicate the position assumed when the roll has been appreciably increased in diameter. From this it will be seen that the angular displacement of the pivotal arms supporting the rewind shaft (which varies in accordance with the increase of the diameter of the rewind rolls) causes a corresponding variation in the angular adjustment of the speed adjusting arm 76 and effects a reduction in the rotative speed of the rewind shafts.

Having thus described my invention with particularity with reference to preferred embodiments of the same, it will be obvious to those skilled in the art, after understanding my invention, that changes and modifications may be made therein without departing from the spirit and scope of the invention, and I aim in the appended claims to cover such changes and modifications as are within the scope of the invention.

What I claim is:

1. In a winding machine the combination of a pair of rewind arms pivotally supported at their inner ends and adapted to support a winding shaft at their outer ends on which shaft a web of sheet material is to be wound into a winding roll whose surface speed it is desired to maintain substantially constant while its diameter increases, the angle of position of said arms varying in accordance with the variation in the radius of said wound roll, one of said arms carrying at its outer end means for driving engagement with said shaft, variable speed means having its power output drivingly connected to said winding shaft driving means, and control means for said variable speed means, said control means comprising a member rotatably mounted for angular movement about a fixed axis and operatively connected to said variable speed means for varying its output speed in accordance with the angular position of said member and an elongated member having one end pivotally connected to one of said rewind arms and its other end disposed in guided engagement with and operatively connected to said rotatable member for varying the angular movement of said rotatable member in accordance with the angular movement of said rewind arm, said variation in said output speed being inversely as the winding roll diameter increases.

2. In a winding machine the combination of a pair of rewind arms pivotally supported at their inner ends and adapted to support a winding shaft at their outer ends, one of said arms carrying at its outer end means for driving engagement with said shaft, a member rotatably supported for angular movement about a fixed axis, an elongated member having one end pivotally attached to the outer end of one of said rewind arms and being in driving engagement with said rotatable member throughout the full angular movement of said rewind arm for causing angular movement of said rotatable member commensurate with the angular movement of said rewind arms, and variable speed mechanism drivingly connected to said winding shaft driving means and having speed adjustment means operatively connected to said rotatable member, whereby upon angular movement of said rewind arms the driving speed of said winding shaft is varied.

3. In a winding machine the combination of a pair of rewind arms pivotally supported at their inner ends and adapted to support a winding shaft at their outer ends for a winding roll whose surface speed it is desired to maintain substantially constant while its diameter increases, one of said arms carrying at its outer end means for driving engagement with said shaft, a variable speed selector having its power output drivingly connected to said winding shaft driving means, and control means for said selector, said control means comprising an arm pivotally mounted at one end on a fixed axis and having its other end operatively connected to said speed selector for varying its output speed inversely as the winding roll diameter increases, and a rod slidably disposed in said arm and pivotally connected to the outer end of one of said rewind arms.

4. In a winding machine the combination of a pair of rewind arms pivotally supported at their inner ends and adapted to support a winding shaft at their outer ends for a winding roll whose surface speed it is desired to maintain substantially constant while its diameter increases, one of said arms carrying at its outer end means for driving engagement with said shaft, variable speed mechanism drivingly connected to said winding shaft driving means, and control means for said variable speed mechanism, said control means comprising an arm pivotally mounted on a fixed axis and having its other end operatively connected to said variable speed mechanism for varying the rotative speed of said winding shaft inversely as the winding roll diameter increases, and a member movable angularly and linearly operatively connecting said arm to the outer end of one of said rewind arms.

THOMAS N. CARTER.

References Cited in the file of this patent

UNITED STATES PATENTS

| Number | Name | Date |
| --- | --- | --- |
| 1,211,058 | Bischoff | Jan. 2, 1917 |

(Other references on following page).

UNITED STATES PATENTS

| Number | Name | Date |
|---|---|---|
| 1,256,499 | Cameron et al. | Feb. 12, 1918 |
| 1,258,185 | Cameron et al. | Mar. 5, 1918 |
| 1,601,784 | Wander | Oct. 5, 1926 |
| 2,176,198 | Berry | Oct. 17, 1939 |
| 2,296,959 | Swanson | Sept. 29, 1942 |
| 2,364,888 | Aycock | Dec. 12, 1944 |
| 2,498,224 | Stone | Feb. 21, 1950 |

FOREIGN PATENTS

| Number | Country | Date |
|---|---|---|
| 13,782 | Great Britain | 1908 |
| 288,575 | Germany | Nov. 6, 1915 |